United States Patent [19]
Morrow

[11] Patent Number: 5,612,909
[45] Date of Patent: Mar. 18, 1997

[54] METHOD AND APPARATUS FOR ROUNDING OPERANDS USING PREVIOUS ROUNDING HISTORY

[75] Inventor: Warren R. Morrow, Vancouver, Wash.

[73] Assignee: Intel Corporation, Santa Clara, Calif.

[21] Appl. No.: 314,705

[22] Filed: Sep. 29, 1994

[51] Int. Cl.⁶ ..................................................... G06F 7/38
[52] U.S. Cl. ............................................................. 364/745
[58] Field of Search ............................................. 364/745

[56] References Cited

U.S. PATENT DOCUMENTS 4,941,120  7/1990  Brown et al. ............................ 364/745
5,313,415  5/1994  Taniguchi ................................ 364/745

*Primary Examiner*—Tan V. Mai
*Attorney, Agent, or Firm*—Blakely, Sokoloff, Taylor & Zafman

[57] ABSTRACT

A rounding mechanism and methodology, particularly useful for complex calculations involving multiple numeric operations (e.g., transcendentals) in which rounding performed on source operands, prior to their use in a current numeric operation, is used to determine the manner in which the result of the current numeric operation is rounded. Therefore, the result is rounded based on the rounding history of its source operands.

29 Claims, 4 Drawing Sheets

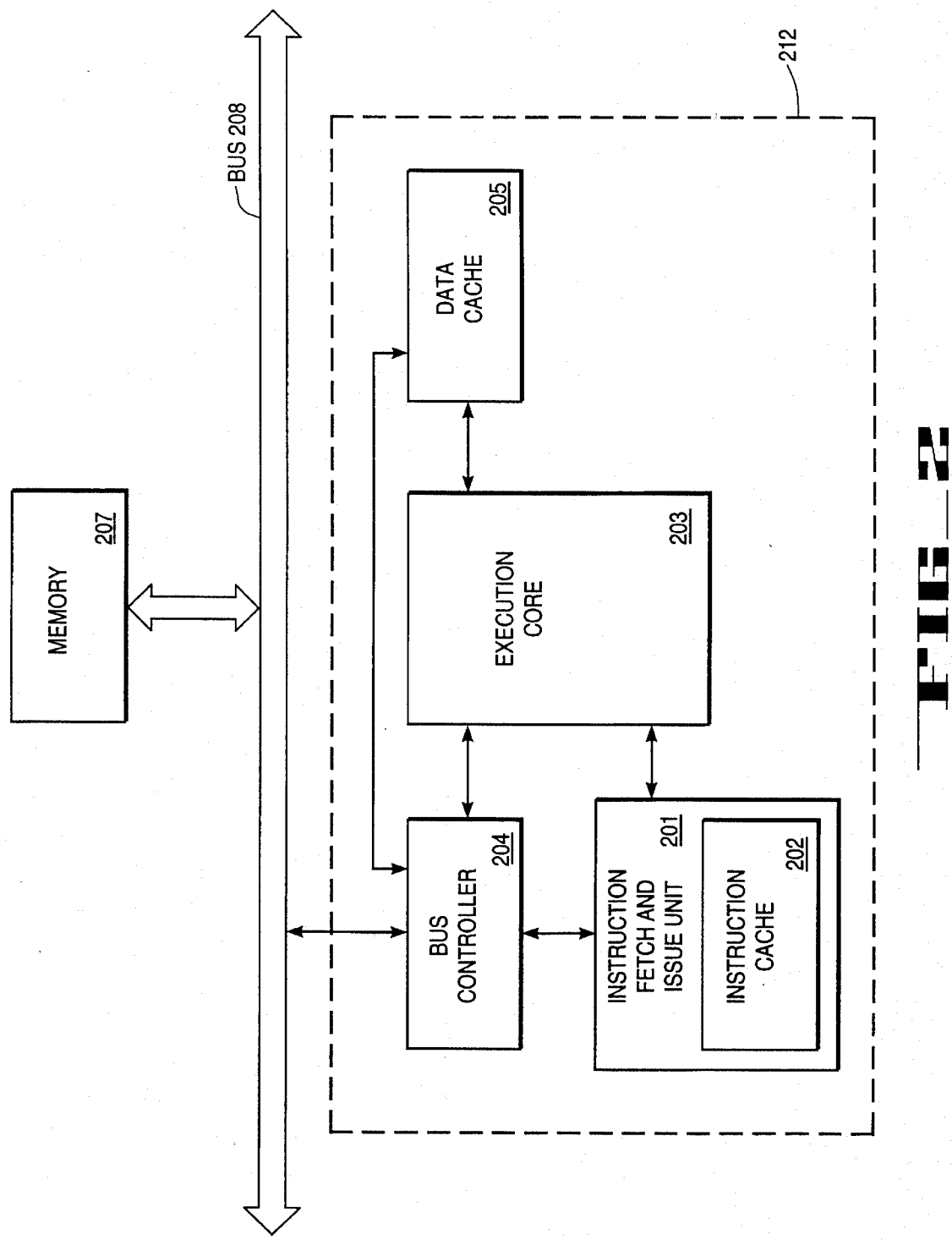
FIG_2

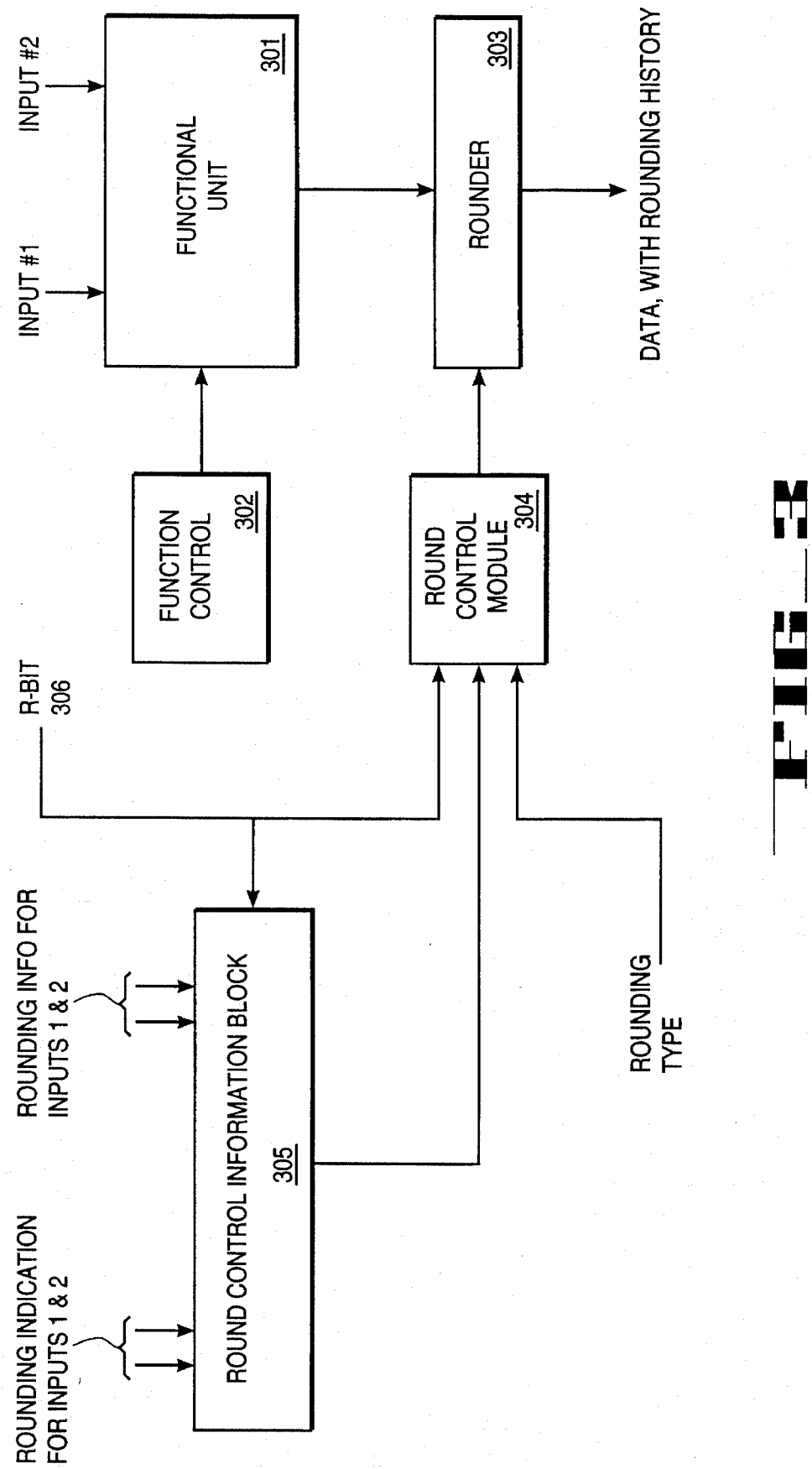
FIG_3

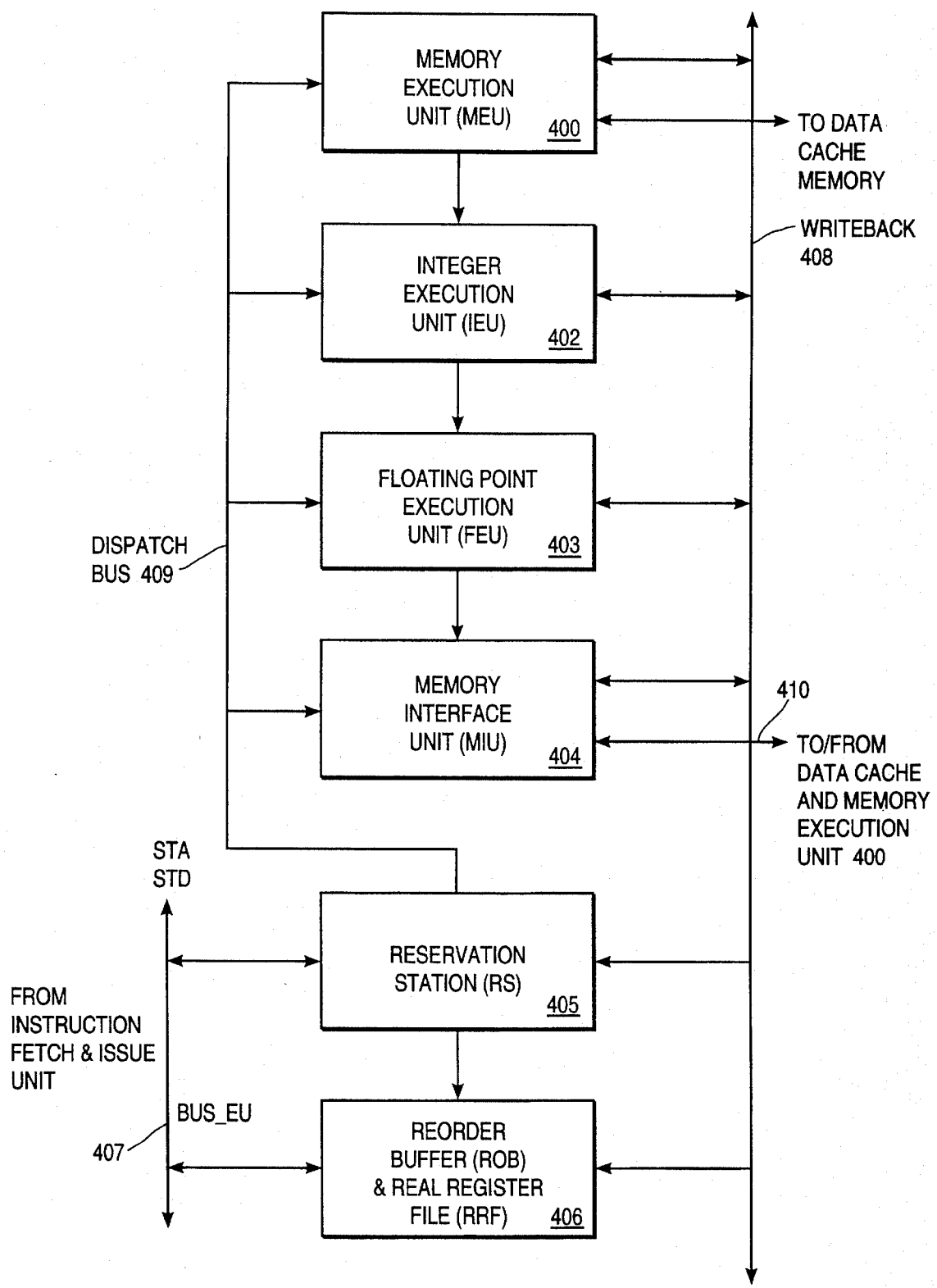
FIG_4

METHOD AND APPARATUS FOR ROUNDING OPERANDS USING PREVIOUS ROUNDING HISTORY

FIELD OF THE INVENTION

The present invention relates to the field of semiconductor numeric processing units. In particular, the present invention relates to the rounding function performed by a numeric processing unit.

BACKGROUND OF THE INVENTION

Typically, a computer system contains a processor, a bus, and other peripheral units. The processor is responsible for executing instructions using the data in the computer system. The bus is used by the processor and the peripheral devices for transferring information between one and another. The information on the bus usually includes data, address and control signals. The peripheral devices compose storage devices, input/output (I/O) devices, etc.

The processor in the computer system usually includes one or more numeric processing units for performing numeric operations specified by instructions received by the processor. These instructions specify operands (e.g., numbers) on which a particular mathematical operation is performed. The number of operands specified is dependent on the operation being performed, with the majority of operations requiring one or two operands.

One of the numeric operations often performed by a processing unit is a transcendental. Transcendentals are time-consuming calculations for common trigonometric, inverse trigonometric, hyperbolic, inverse hyperbolic, logarithmic and exponential functions. These functions typically cannot be calculated precisely. Therefore, approximations are used for these functions. These approximations often require many intermediate numeric calculations.

The intermediate and (pre-rounded) final results of performing numeric operations may have to be rounded. Rounding an operand refers to the deletion of one or more of the least significant digits of the operand and may include the adjustment of the remaining portion of the operand in accordance with some specified rule. Once it is determined that a number needs to be rounded, a rounding method must be selected. Some of the more common rounding methods include: truncation, round toward positive infinity, round toward negative infinity and round to nearest/even. Truncation, referred to as "chop" or "round toward zero", corresponds to deleting a portion of the least significant bits, thus producing a value smaller in magnitude (i.e., closer to zero) than the unrounded value. Rounding toward positive infinity implies increasing the operand's magnitude if the operand is positive or decreasing the operand's magnitude if its magnitude is negative. Rounding toward negative infinity implies decreasing the operand's magnitude if the operand is positive or increasing the operand if the magnitude of the operand is negative.

One purpose for rounding is to reduce the number of digits in the operand so that the rounded operand can fit within the word size of the processing unit. In floating point operands, a notation is used in which the operand is characterized as a characteristic and a mantissa. The characteristic reference represents the integral value of the number, and the mantissa represents the decimal value of the number. For example, if the number 6.3124 is comprised of a characteristic of 6 and a mantissa of 3124. With respect to floating point operations, there are many situations in which the result of a floating point operation exceeds the processing units word size. For example, the addition of two n-bit numbers might result in a sum of n+1 bits. Consequently, an overflow results if the word size is only n-bits long. To fit the result into the word size, the number may be shifted one position to the right, the least significant bit (LSB) deleted and the exponent increased. In order to dispose of the LSB while still preserving accurate results, the number is rounded according to one of several rounding methods.

Another reason for rounding is to scale the mantissa to certain precisions. The longer the mantissa length, the more precise it becomes. However, calculations using operands with longer mantissas require more time because more bits are being manipulated. Commonly, precisions are adapted according to the specification set forth in the Institute of Electrical and Electronic Engineers (IEEE) standard 754. The standard specifies four precisions: single, single-extended, double and double-extended. Implementations are not required to have all four precisions.

By way of illustration, single precision is 24-bits in length. Double precision consists of 53-bits and extended precision consists of 64-bits. Thus, if the user selects single precision, every bit trailing LSB "43"(bits 42-0 of a 68-bit number) is deleted and set to "0". The LSB is rounded depending upon the rounding method chosen. Likewise, if the user selects double precision, the LSB "14"and trailing bits "13-0"are set to zero. The appropriate rounding is then implemented. The same procedure occurs if extended precision is selected. The only difference is that LSB is bit "3"and bits "2-0"are set zero. Again, the appropriate rounding is performed.

Rounding is often utilized in performing the numeric calculations associated with transcendentals or other complex calculations that require multiple subcalculations. Because the transcendentals involve multiple calculations, the use of rounding may occur at numerous times when arriving at a result. It is a valuable characteristic for an approximation of a transcendental to be monatomic. Monotonicity indicates that an approximation represents an "ever increasing" or "ever decreasing" function with respect to infinite mathematics. The indiscriminate use of rounding at multiple times during the calculation of a transcendental can cause an approximation to not be monatomic. Therefore, it is desirable to calculate transcendentals and other complex numeric operations that require multiple subcalculations in such a manner as to maintain their monotonicity.

The present invention provides a method and apparatus for rounding operands. The present invention also rounds operands such that their monotonicity is maintained.

SUMMARY OF THE INVENTION

A method and apparatus for performing rounding is described. The present invention includes performing an intermediate calculation as one of multiple calculations being performed to produce a result. The results of the intermediate calculation are rounded and the manner in which the results were rounded is stored as a rounding history. A subsequent calculation using the result is performed to produce another result. This result is rounded based in part on the rounding history.

BRIEF DESCRIPTION OF THE DRAWINGS

The present invention will be understood more fully from the detailed description given below and from the accompanying drawings of the preferred embodiments of the invention, which, however, should not be taken to limit the invention to the specific embodiments, but are for explanation and understanding only.

FIG. 1 is a block diagram of one embodiment of the computer system of the present invention.

FIG. 2 is a block diagram of one embodiment of the processor of the present invention.

FIG. 3 is one embodiment of the floating-point execution unit of the present invention.

FIG. 4 illustrates one embodiment of the execution core of the present invention.

DETAILED DESCRIPTION OF THE INVENTION

Figure 1:
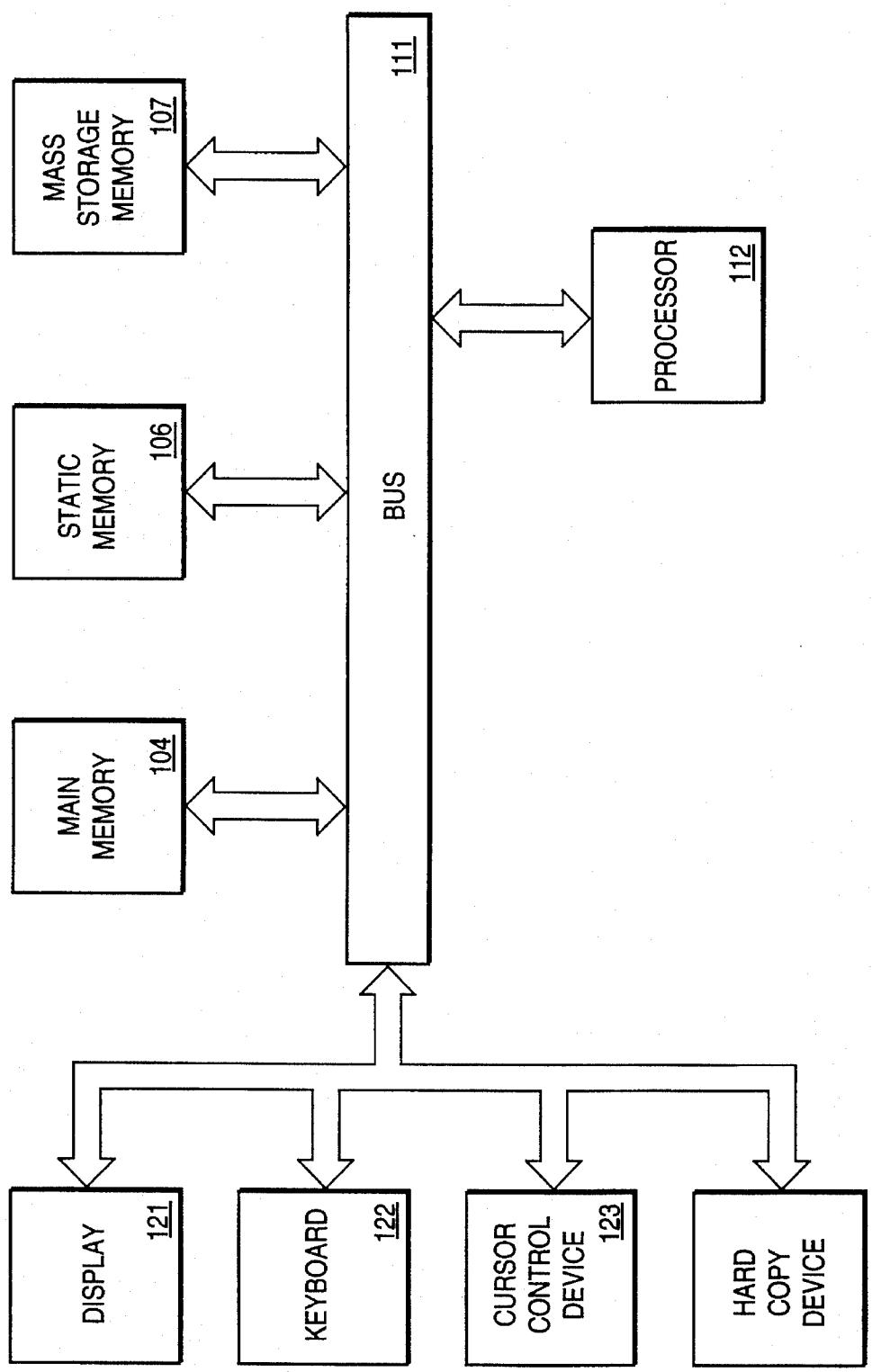

A method and apparatus for rounding operands is described. In the following detailed description of the present invention numerous specific details are set forth, such as specific rounding methods, bit numbers, signal names, etc., in order to provide a thorough understanding of the present invention. However, it will be apparent to one skilled in the art that the present invention may be practiced without these specific details. In other instances, well-known structures and devices are shown in block diagram form, rather than in detail, in order to avoid unnecessarily obscuring the present invention.

The present invention provides for performing rounding during complex numeric operations, such as transcendentals, using the rounding history associated with of one or more of the operands in the numeric operation. The rounding history is not limited to being that of the individual operands in the numeric operation. In some instances, it may be advantageous to employ rounding history of previous numeric operations within a complex numeric instruction. In this manner, the rounding history of individual mathematical operations may be used to affect the rounding of subsequent mathematical operations.

The present invention utilizes previous rounding history when rounding is performed in algorithmic implementations of complex numeric algorithms. By utilizing previous rounding history, the relative error can be made appreciably less so as to reduce the worst-case error of the overall algorithmic implementation.

In the present invention, the rounding history of an operand indicates the nature of the rounding that the operand has incurred in the past. This history may provide an indication as to the rounding direction for the corresponding operation(s) that produced the operand. This rounding history may provide an indication as to whether rounding was performed or not, whether a truncation was performed on the operand, whether the operand was rounded up, down or to the nearest, etc. The rounding history may provide information as to the nature of the bits that were subject to the rounding operation. For instance, the rounding history may indicate whether the rounded bits were exactly half way between two numbers. The bits may indicate whether all of the bits subjected to rounding were ones prior to rounding. In such a case, a subsequent rounding decision may prefer to round-up instead of round-down, or vise versa, on the basis of that information.

The rounding history may be used for subsequent numeric operations that use the operand(s) that have the attached "rounding history" associated with them. Utilizing the rounding history (and the sign of the source opemnd(s)), the accuracy of the result of combining the sources prescribed by the numeric instruction can be improved beyond what is achievable assuming that the sources were equally accurate. The present invention provides control to indicate how the rounding history should be utilized to affect subsequent operations.

By using the previous rounding history, the present invention directly improves the algorithmic implementations of complex numeric instructions, such as transcendentals.

Overview of the Computer System of the Present Invention

Referring to FIG. 1, the computer system upon which a preferred embodiment of the present invention is implemented is shown as 100. Computer system 100 comprises a bus or other communication means 111 for communicating information, and a processor 112 coupled with bus 111 for processing information. Processor 112 includes, but is not limited to a microprocessor, such as an Intel Architecture Microprocessor, manufactured by Intel Corporation of Santa Clara, Calif., the corporate assignee of the present invention. Processor 112 may also be another processor such as the PowerPC™, Alpha™, etc. System 100 further comprises a random access memory (RAM) or other dynamic storage device 114 (referred to as main memory), coupled to bus 111 for storing information and instructions to be executed by processor 112. Main memory 114 also may be used for storing temporary variables or other intermediate information during execution of instructions by processor 112. Computer system 100 also comprises a read only memory (ROM) and/or other static storage device 116 coupled to bus 111 for storing static information and instructions for processor 112, and a data storage device 117, such as a magnetic disk or optical disk and its corresponding disk drive. Data storage device 117 is coupled to bus 111 for storing information and instructions.

Computer system 100 may further be coupled to a display device 121, such as a cathode ray tube (CRT) or liquid crystal display (LCD), coupled to bus 111 for displaying information to a computer user. An alphanumeric input device 122, including alphanumeric and other keys, may also be coupled to bus 111 for communicating information and command selections to processor 112. An additional user input device is cursor control 123, such as a mouse, trackball, trackpad, stylus, or cursor direction keys, coupled to bus 111 for communicating direction information and command selections to processor 112, and for controlling cursor movement on display 111. Another device which may be coupled to bus 111 is hard copy device 124 which may be used for printing instructions, data, or other information on a medium such as paper, film, or similar types of media. Furthermore, a sound recording and playback device, such as a speaker and/or microphone may optionally be coupled to bus 111 for audio interfacing with computer system 100. Note that any or all of the components of system 100 and associated hardware may be used in a preferred embodiment. However, it can be appreciated that other configurations of the computer system may include some or all of these devices.

FIG. 2 is a block diagram of one embodiment of the processor of the present invention, including memory in the computer system. Referring to FIG. 2, the processor comprises an instruction fetch and issue unit 201 with an integrated instruction cache 202, an execution core 203, a bus controller 204, a data cache memory 205, a memory unit 207, and a bus 208.

The memory unit 207 is coupled to the system bus 208. The bus controller 204 is coupled to the bus 208. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. In the present invention, the instruction fetch and issue unit 201, the execution core 203, the bus controller 204, and the data cache memory 205 together comprise the processor 102 (FIG. 1). In the present invention, elements 201–205 cooperate to fetch, issue, execute and save the execution results of instructions in a pipelined manner.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 102. In addition, it manages cache coherency transfers. The instruction fetch and issue unit 201 decodes the instructions in cooperation with a microcode unit within issue unit 201. The instruction fetch and issue unit 201 issues these instructions in order to the execution core 203. Instructions corresponding to transcendental or other complex functions are decoded and issued as a series of microcode operations for execution by execution core 203. The execution core 203 performs arithmetic and logic operations, such functions as add, subtract, logical AND, integer multiply and complex numeric operations (e.g., transcendentals), as well as memory operations. Some instructions are fetch and issued speculatively.

The execution core 203 includes an execution unit that holds and executes the integer and floating point instructions. Similarly, the execution core 203 also includes a memory execution unit that holds, executes and dispatches load and store instructions to the data cache memory 205 (as well as external memory). Note that in one embodiment, instructions are executed as soon as their operand dependencies on execution results of preceding instructions are resolved, including those load and store instructions that are speculatively fetched and issued.

The data cache memory 205 respond to the Icad and store instructions immediately. In one embodiment, the instructions are not necessarily executed/forward in the order they were issued, and some instructions are speculatively executed/forwarded. However, the execution results of the integer, floating point and Icad instructions are buffered, and then committed to processor state in program order. The buffered store instructions are committed to processor state in program order. Speculative integer, floating point and Icad execution results and buffer stores of mis-predicted branches are purged. Note that the speculative nature of fetched, issued and executed instructions is attributed to the uncertainty of whether a particular instruction or set of instructions is to be executed due to an unaffirmed branch prediction.

Instruction fetch and issue unit 201 is intended to represent a broad category of instruction fetching and issuing elements found in many computer systems. Their constitutions and functions are well-known and will be described only as necessary with reference to later figures.

The bus controller 204, the bus 208, and the memory 207 are also intended to represent a broad category of these elements found in most computer systems. Their functions and constitutions are well-known and will not be described further. The execution core 203, incorporating with the teachings of the present invention, and the data cache memory 205 will be described further in detail below with additional references to the remaining figures.

When executing instructions, the floating point portion of the execution core 203 is configurable to provide one of four rounding modes. These rounding modes include truncation, round-up, round-down and round to nearest. The rounding modes may be selected by setting a register bit using the set up code dudng initialization of the processor or may be specified by the program itself. Note that for complex instructions (e.g., transcendentals), the micro-program (microcode) may select the rounding mode independent of the program setting.

The present invention uses rounding information generated as a result of a numeric computation for use in a subsequent computation. In the present invention, these computations are in an algorithmic series of computations directed at executing a complex numeric instruction. This rounding information is referred to as the rounding history.

Rounding of an operand only affects data on one side of the rounding point (e.g., precision point). In the present invention, an extra bit may be included to indicate whether or not rounding occurred. In one embodiment, the extra bit being set may not only indicate rounding occurred, but also the type of rounding (e.g., round to positive infinity). Extra rounding information may also be included and may be some number of bits that indicates attributes about one or more features about the data that was thrown away. For instance, the data could indicate if the pre-rounded data was exactly halfway between two values, or if it was greater or less than exactly half-way between two values.

The use of the rounding information of an intermediate, and maybe internal, calculation allows for better rounding decisions to be made in subsequent calculations in the algorithmic series of computations. Previous rounding knowledge can be very helpful in a subsequent rounding decision. For instance, if a result set for rounding is halfway between two numbers and it was known that the input operands were rounded up previously, then control may indicate that rounding up again would not be representative of the real result. That is, knowing that you are actually not at the halfway point because you rounded up previously is deterministic of whether you should round up at this point.

In one embodiment, the rounding history includes the type of rounding previously performed and information on the relative data difference with respect to the data that was eliminated and the data resulting after the rounding. This relative data difference is referred to as a precision difference.

The rounding information in the present invention is associated with the result data and is available for use with the next calculation. The rounding information may be stored in registers or other storage locations and referenced through the use of tags or pointers. In one embodiment, the computer system is a system that allows information from a particular numeric calculation to be fed to the next calculation under the direction of a control mechanism. The control mechanism, or another control mechanism, may be used to indicate how the rounding information is to be used.

It should be noted that although algorithmic implementations of transcendentals and floating point operations are applications, the present invention is also applicable to integer operations (and "block" floating-point, which is a type of mixed integer and floating-point numerics implementation) where the resultant integer requires rounding.

FIG. 3 illustrates a numeric computational unit within the execution core 203 incorporating the teachings of the invention. Referring to FIG. 3, a functional unit 301 receives inputs 1 and 2 and performs a function. The function may be one of a number of functions, such as addition, multiplication, subtraction, division, etc. The functional unit 301 operates under the control of the functional control module 302. The result of the functional unit 301 is output to a rounding unit, referred to as rounder 303. The rounder 303 performs rounding on the resultant data in response to control from the round control module 304. In one embodiment, the output of the rounder 303 includes the resultant data as well as a bit indicating where the rounding occurred and rounding information depicting one or more features of the data that was rounded.

When the data is rounded and fed back for the subsequent calculation, the rounded bits of each operand along with the rounding information associated with each operand are fed into a round control information block 305 which determines the necessary rounding to occur between the two operands. Thus, the rounding history associated with inputs 1 and 2 is received by control block 305. A rounding (R)-bit is also received by control block 305. An output from the round control block 305 is sent to the round control module 304 to control the rounder 303.

The round bit 306 indicates whether to use rounding or not. Thus, the round bit 306 acts as an enable bit. The round bit 306 may be used to either enable the use of prior art rounding or the rounding of the present invention (using the previous rounding history). In one embodiment, the round bit 306 is sent from the microcode unit. The round bit 306 is also received by the round control module 304.

Another input to the round control information block 305 and the round control module 304 is round control data indicating the type of rounding that is to be performed. For instance, the round control data may indicate whether the rounding is to be round to nearest, round-up, round-down or round to zero (truncation). In other words, the round control data indicates what rounding mode is to be entered. The rounding mode and the rounding that was performed previously (i.e., the rounding history) determine what rounding is invoked. The rounding employed is dependent on the data associated with the operands. For instance, if one or both operands were rounded up previously and the result is at the half-way point between two allowable values (and rounding is required to one of these two values), then the resultant data may be rounded down. However, if at least one of the inputs had been rounded down previously and the resulting data is at a halfway point, then the data may be rounded up. In either case, the result is more accurate.

In the present invention, the control usage of rounding history is operation dependent. Assuming multiplication or addition operations for the following example, if the rounding mode is "round-to-nearest" and the current pre-rounded result is exactly half way between two values (e.g., round-bit=1, sticky bit=0), and if:

| Input A was rounded | Input B was rounded | Round |
| --- | --- | --- |
| up | up | down |
| up | down | normal round rules |
| up | exact | down |
| exact | exact | normal round rules |
| exact | down | up |
| down | down | up |

Note that use of the sticky bit is well-known in the art. Also, the normal rules correspond to rules which are usually applied when implementing the rounding mode (round-to-nearest in this case) independent of the previous rounding history of any source operands involved in the calculation.

If round toward positive infinity is the rounding mode and the current pre-rounded result is exactly halfway between two values (e.g., round bit=0, sticky bit=0), and if:

| Input A was rounded | Input B was rounded | Round |
| --- | --- | --- |
| up | down | round rules (i.e., down) |
| up | exact | round rules (i.e., down) |
| exact | exact | normal rules (i.e., down) |
| exact | down | up |
| down | down | up |

Note that in the case where one of the source operands comes from memory the rounding information may be cleared or set to a default value, either of which may be handled by the round control module 304.

FIG. 4 is a block diagram of one embodiment of the execution core of the present invention. Referring to FIG. 4, execution core 203 comprises a reservation station (RS) 405, a memory execution unit MEU 400, an integer execution unit (IEU) 402, a floating point execution unit (FEU) 403, a memory interface unit (MIU) 404, a reorder buffer (ROB) and real register file (RRF) 406. Additionally, execution core 203 includes an internal bus ($Bus_{13}$ EU) 407 and a writeback bus 408. MEU 400, AGU 401, IEU 402, FEU 403 and MIU 404 are all coupled to reservation station 405 via a dispatch bus 409. They are also coupled to writeback bus 408. MIU 404 is also coupled to the data cache memory and MEU 400 via bus 41 0. RS 405 is coupled to the writeback bus 408 and the $Bus_{13}$ EU 407. RS 405 is also coupled to ROB and RRF 406. ROB and RRF 406 is also coupled to the $Bus_{13}$ EU 407 and the writeback bus 408. Together, elements 400–410 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 405 receives and stores the issued instructions resolving their operands with data from the IEU 402, the FEU 403, the data cache memory, the ROB and RRF 406 and holds them until their operands are all resolved. The RS 405 then dispatches the issued instructions to the AGU 401, the IEU 402, the FEU 403 and the MIU 404 and the MEU 400 as appropriate.

The MEU 400, the IEU 402, FEU 403, and the MIU 404 in turn perform their operations accordingly. The execution results of the integer, floating point and load instructions are held in the ROB 406, and then committed by RRF 406 in the order these instructions were issued. Speculative execution results of the mispredicted branches are not committed, but instead are held in the ROB 406 and purged upon their detections.

When employing the teachings of the present invention in cooperation with the execution core as depicted in FIG. 4, the data and its rounding history remain together. As resultant data is produced, it is written back to RS 405 over the writeback bus with its rounding history. This allows subsequent dependent instructions to gain immediate access not only to the resultant data, but its rounding history as well. The present invention allows rounding to be integrated into many complex, numeric algorithms. The present invention also improves accuracy, particularly as it relates to maintaining monotonicity.

The present invention provides for utilizing the previous rounding history in such a manner that the data path size is not increased. That is, the present invention allows for previous execution history to be utilized without increasing the number of bits in the underlying numerics. In floating point operations, the size of the data path is dictated by the number of bits in the mantissa. To improve intermediate calculations, one prior art solution was to add more bits which makes the mantissa larger. This increases the complexity of the numerics circuitry and increases calculation latency. However, the size of the unit is dictated by the data path unit length and the present invention avoids adding any bits to the mantissa.

Furthermore, the time required to perform the floating point calculation am dictated by the data path and the rounding of the data path. The present invention allows the information to be calculated early with respect to whether or not rounding is to occur and the type of rounding that is to be performed. This calculation is performed in parallel to the data path calculation. For instance, a floating point multiplication is performed, requiring a large number of cycles. During this time, the rounding information can be decoded to determine the type of rounding to be performed. In this manner, the rounding approximation to be made is ready when the rounding is to be performed (i.e., when the data path calculation has concluded). Therefore, the present invention allows a decision to be made early and easily forwarded by the time rounding is to be utilized.

The present invention also allows for easy retrofitting. In the case of a microcoded solution, adjustments could be made to the microcode to allow it to retain the rounding information that would have normally been discarded after the rounding has taken place.

In one embodiment, where the complex numeric operations are implemented in microcode, the execution time is unaffected by the present invention and only limited hardware support is required. Therefore, the present invention provides significant value at little cost.

Whereas many alterations and modifications of the present invention will no doubt become apparent to a person of ordinary skill in the art after having read the foregoing description, it is to be understood that the particular embodiment shown and described by way of illustration is in no way intended to be considered limiting. Therefore, references to details of the preferred embodiment are not intended to limit the scope of the claims which in themselves recite only those features regarded as essential to the invention.

Thus, a method and apparatus for rounding numbers based on rounding histories has been described.

I claim:

1. A method for performing a numeric calculation having a plurality of intermediate numeric operations, said method comprising the steps of:

performing a first intermediate numerical operation, wherein the step of performing the first intermediate numerical operation comprises rounding if necessary to produce a first result and producing a rounding history indicating any rounding performed in producing the result; and performing a second intermediate numeric operation subsequent to the first intermediate numeric operation using the first result to generate a second result, wherein the step of performing the second intermediate numeric operation includes performing rounding based on the rounding history of the first intermediate numeric operation.

2. The method defined in claim 1 wherein the step of producing a rounding history comprises producing an indication as to whether the result is produced using rounding.

3. The method defined in claim 1 wherein the rounding history provides an indication as to the result prior to rounding.

4. The method defined in claim 1 wherein the step of performing a second intermediate numeric operation includes the step of determining a rounding type to be used in applying rounding to based on the rounding history.

5. The method defined in claim 1 further comprising the step of encoding the first result and the rounding history.

6. The method defined in claim 1 further comprising the step of storing the first result and the rounding history as an entry in a storage medium.

7. The method defined in claim 1 further comprising the step of storing the first result and the rounding history as an entry in a reorder buffer.

8. The method defined in claim 1 wherein the rounding history indicates a rounding direction of the first intermediate numeric operation.

9. A method for performing an instruction in a computer system comprising the steps of:

decoding the instruction into a plurality of numeric operations;

performing the plurality of numeric operations, wherein the step of performing includes the steps of
      performing a first numeric operation of the plurality of numeric operations including the steps of performing any specified rounding to produce a first result and generating a rounding history that indicates any specified rounding;
      performing a second numeric operation of the plurality of numeric operations and performing rounding on the second result based on the rounding history to produce a second result.

10. The method defined in claim 9 the step of generating a rounding history produces an indication as to whether the result is produced using rounding.

11. The method defined in claim 9 wherein the rounding history provides an indication as to the result prior to rounding.

12. The method defined in claim 11 further comprising the step of coding the indication.

13. A numeric computational unit comprising:

a function unit having a first input and a second input, wherein said function unit performs a numeric operation on a first operand received from the first input and a second operand received from the second input to generate an output having data and a rounding history;

a round control coupled to the function unit, wherein the round control provides a rounding control indication in response to the rounding history to indicate rounding to be performed in the output; and a rounding unit coupled to receive the output of the function unit and the round control, wherein the rounding unit rounds the output in response to the rounding control indication to generate a result.

14. The computational unit defined in claim 13 wherein the function unit and the round control operate in parallel.

15. The computational unit defined in claim 13 further comprising a functional control coupled to the functional unit to indicate the numeric operation to be performed on the first operand and the second operand by the functional unit.

16. The computational unit defined in claim 13 wherein the round control generates the round control indication in response to a first rounding history associated with the first operand and a second rounding history associated with the second operand.

17. The computational unit defined in claim 13 wherein the rounding history indicates whether rounding occurred with respect to at least one of either the first operand or the second operand.

18. The computational unit defined in claim 13 wherein the rounding history indicates whether the result is produced using rounding.

19. The computational unit defined in claim 13 wherein the rounding history provides an indication as to the result prior to rounding.

20. The computational unit defined in claim 13 wherein the rounding history provides an indication as to a precision difference due to rounding.

21. A processor for use in executing a plurality of instructions in a computer system, said processor comprising:

a numeric computational unit for performing a series of numeric operations corresponding to an instruction, wherein the computational unit produces an output;

a round control configured to provide a rounding control indication in response to rounding history, wherein the rounding control indication indicates rounding to be performed in the output; and a rounding unit coupled to the round control and coupled to receive the output, wherein the rounding unit rounds the output in response to the rounding control indication, such that a result is generated.

22. The processor defined in claim 21 further comprising a decoder for decoding the plurality of instructions, wherein the decoder supplies a series of numeric operations in response to one of the plurality of instructions, and wherein the decoder includes a microcode unit and the series of numeric operations comprises a plurality of microcode instructions.

23. The processor defined in claim 21 wherein the numeric computational unit and the round control operate in parallel.

24. The processor defined in claim 21 further comprising a functional control coupled to the numeric computational unit to indicate a numeric operation to be performed on the first operand and the second operand by the functional unit.

25. The processor defined in claim 21 wherein the round control generates the round control indication in response to a first rounding history associated with the first operand and a second rounding history associated with the second operand.

26. The processor defined in claim 21 wherein the rounding history indicates whether rounding occurred with respect to at least one of either the first operand or the second operand.

27. The processor defined in claim 26 wherein the rounding history provides an indication as to a precision difference due to rounding.

28. The processor defined in claim 21 wherein the rounding history indicates whether the result is produced using rounding.

29. The processor defined in claim 21 wherein the rounding history provides an indication as to the result prior to rounding.

* * * * *

UNITED STATES PATENT AND TRADEMARK OFFICE
CERTIFICATE OF CORRECTION

PATENT NO. : 5,612,909
DATED : March 18, 1997
INVENTOR(S) : Warren R. Morrow It is certified that error appears in the above-identified patent and that said Letters Patent is hereby corrected as shown below:

In column 1 at line 20 delete "compose" and insert --comprise--

In column 3 at line 66 delete "opemnd(s))," and insert --operand(s)),--

In column 5 at line 38 delete "Icad" and insert --load--

In column 5 at line 43 delete "Icad" and insert --load--

In column 6 at line 4 delete "dudng" and insert --during--

In column 8 at line 21 delete "(Bus$_{13}$ EU)" and insert --(Bus_EU)--

In column 8 at line 27 delete "Bus$_{13}$ EU 407." and insert --Bus_EU 407.--

In column 8 at line 28 delete "Bus$_{13}$ EU 407" and insert --Bus_EU 407--

UNITED STATES PATENT AND TRADEMARK OFFICE
CERTIFICATE OF CORRECTION

PATENT NO. : 5,612,909
DATED : March 18, 1997
INVENTOR(S) : Warren R. Morrow

It is certified that error appears in the above-indentified patent and that said Letters Patent is hereby corrected as shown below:

In column 9 at line 10 delete "am" and insert --are--

Signed and Sealed this

Twenty-fourth Day of June, 1997

Attest:

BRUCE LEHMAN

Attesting Officer     Commissioner of Patents and Trademarks